United States Patent
Iinuma (10) Patent No.: US 6,901,124 B1
(45) Date of Patent: May 31, 2005

(54) DIVERSITY RECEIVING APPARATUS THAT PREVENTS JUDGEMENT ERRORS DURING DECODING AND A CLOCK GENERATING CIRCUIT FOR A DIVERSITY CIRCUIT THAT PREVENTS JUDGEMENT ERRORS DURING DECODING

(75) Inventor: Toshinori Iinuma, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/857,184

(22) PCT Filed: Dec. 25, 1998

(86) PCT No.: PCT/JP98/05941

§ 371 (c)(1),
(2), (4) Date: Jun. 19, 2001

(87) PCT Pub. No.: WO00/39976

PCT Pub. Date: Jul. 6, 2000

(51) Int. Cl.[7] ............................................. H04L 1/02
(52) U.S. Cl. ...................................... 375/347; 375/267
(58) Field of Search ............................... 375/147, 267, 375/316, 329, 331, 332, 340, 346, 347; 455/65, 132, 296, 504, 137, 303

(56) References Cited

U.S. PATENT DOCUMENTS

| | | | |
|---|---|---|---|
| 5,761,252 A | 6/1998 | Iinuma | 375/347 |
| 5,889,826 A | * 3/1999 | Takahashi | 375/347 |
| 6,069,912 A | * 5/2000 | Sawahashi et al. | 375/142 |
| 6,289,062 B1 | * 9/2001 | Wang et al. | 375/346 |
| 6,577,686 B1 | * 6/2003 | Koga et al. | 375/347 |

FOREIGN PATENT DOCUMENTS

| | | |
|---|---|---|
| EP | 0 683 571 A2 | 5/1995 |
| JP | 6-177806 | 6/1994 |
| JP | 7-307724 | 11/1995 |
| JP | 8-97804 | 4/1996 |
| JP | 9-214410 | 8/1997 |
| JP | 11-32001 | 2/1999 |

* cited by examiner

Primary Examiner—Chieh M. Fan
(74) Attorney, Agent, or Firm—Arent Fox PLLC (57) ABSTRACT

A diversity receiving apparatus separately weights reception signals of a plurality of reception systems using combining coefficients based on a respective amplitude component of each reception signal and combines the weighted reception signals. The diversity receiving apparatus extracts symbol sections in the combined reception signals, and generates a clock for detecting symbols. The diversity receiving apparatus includes a converting unit 314 for uniformly multiplying the combining coefficients if every combining coefficient is below a predetermined threshold and I component ROMs, Q component ROMs, an I component adder 325 and a Q component adder 326 that combine the reception signals using the multiplied combining coefficients.

13 Claims, 8 Drawing Sheets

DIVERSITY RECEIVING APPARATUS THAT PREVENTS JUDGEMENT ERRORS DURING DECODING AND A CLOCK GENERATING CIRCUIT FOR A DIVERSITY CIRCUIT THAT PREVENTS JUDGEMENT ERRORS DURING DECODING

TECHNICAL FIELD

The present invention relates to a diversity receiving apparatus for use by a radio communication device and to a clock generating circuit for use by a diversity receiving apparatus.

BACKGROUND ART

Digital radio communication devices conventionally transfer information by modulating a carrier wave using a baseband signal that corresponds to the information to be transmitted.

A variety of digital modulation methods have been used to modulate the carrier wave. With ASK (Amplitude Shift Keying), the amplitude of the carrier wave signal changes according to the baseband signal. With FSK (Frequency Shift Keying), the frequency of the carrier wave is changed. With PSK (Phase Shift Keying), the phase of the carrier wave is changed. With QAM (Quadrature Amplitude Modulation) the amplitude and phase of the carrier wave are independently changed.

Radio communication devices that receive signals that have been modulated using the digital modulation methods described above demodulate the received signals by performing the opposite of the modulation processing to obtain the original data.

When digital modulation methods are used for mobile communication, it is well known that reception characteristics can be seriously affected by fading, a name given to wild fluctuations in the reception level due to the reflection and scattering of radio waves.

Diversity reception methods are effective in compensating for the decreases in reception level due to fading. Diversity reception methods have the same signal received via a plurality of reception systems and combine a plurality of received signals to produce a high-quality reception signal.

Several diversity reception methods are available. A selection combining method selects the received signal with the highest level out of the signals received by each reception system and demodulates the selected reception signal. An equal-gain combining method combines the reception signals of each reception system at the same level and demodulates the resulting signal. A maximal-ratio combining method gives a weighting to the reception signal of each reception system in proportion to its relative reception level, combines the weighted reception signals, and demodulates the result.

Of the above methods, the maximal-ratio combining method combines signals after assigning higher weightings to signals with higher reception levels. This means that signals with lower levels of noise are assigned higher weightings, so that reception signals are effectively combined by this method.

The following is a description of a diversity receiving apparatus that uses the maximal-ratio combining method.

Figure 8:
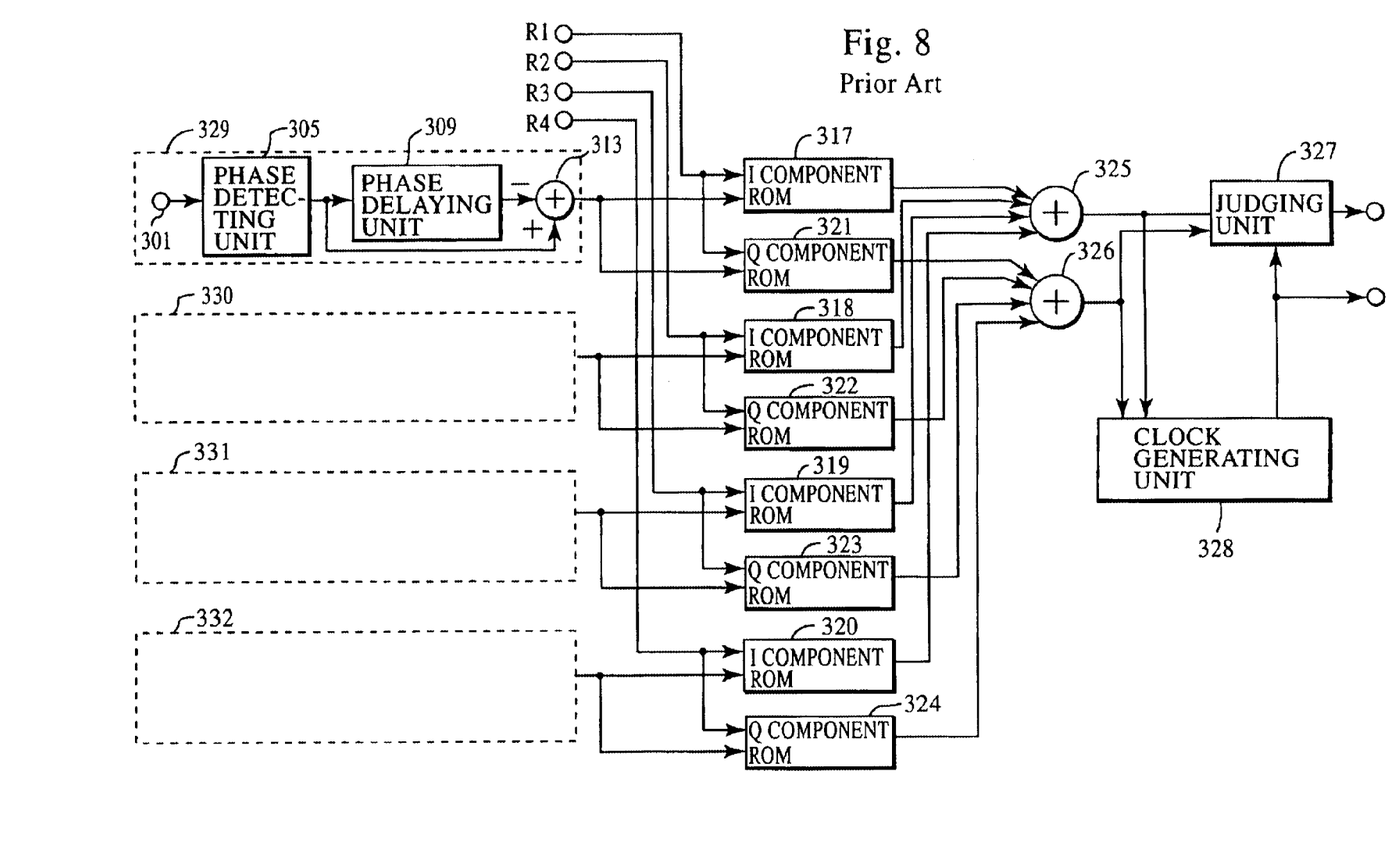
FIG. 8 shows a conventional diversity receiving apparatus for the maximal-ratio combining method.

FIG. 8 shows the construction of a diversity receiving apparatus that uses the maximal-ratio combining method.

This diversity receiving apparatus is a reception device that receives transmission data which has been modulated using QPSK. The diversity receiving apparatus decodes the transmission data by performing QPSK demodulation and by combining signals that are weighted according to their relative reception levels.

QPSK refers to a transmission method for two-bit (four-value) information. First, two orthogonal carrier waves are separately subjected to phase modulation according to a two-bit baseband signal. The two modulated signals resulting from the modulation are then added and transmitted. A reception device performs the opposite processing to the QPSK modulation and so obtains two-bit (four-value) information for each symbol.

As shown in FIG. 8, the diversity reception apparatus includes phase demodulating units 329~332, I component ROMs 317~320, Q component ROMs 321~324, an I component adder 325, a Q component adder 326, a judging unit 327, and a clock generating unit 328.

The phase demodulating units 329~332 detect phase differences between the phase of the received reception signal and the phase of the immediately preceding symbol. The phase demodulating units 329~332 output the results as phase data θk (where k=1, 2, 3, 4). Here, the values k=1, 2, 3, 4 respectively correspond to the phase demodulating units 329, 330, 331, and 332.

In detail, the phase demodulating unit 329 includes the input terminal 301, the phase detecting unit 305, the phase delaying unit 309, and the phase adding unit 313. This composes a phase detection-type delay detection device corresponding to the PSK (Phase Shift Keying) modulation method.

The input terminal 301 is a terminal through which a reception signal, which has been digitized by an A/D converter or a limiter, is inputted into the present diversity receiving apparatus.

The phase detecting unit 305 compares the phase of the reception signal inputted via the input terminal 301 with the phase of a local oscillator (not illustrated) and outputs the detected phase value that has been digitized. This means that the phase detecting unit 305 detects only the phase component of the reception signal. Since the amplitude component of the reception signal is not required by the phase detecting unit 305, a linear amplifier is not required.

The phase delaying unit 309 delays the detected phase outputted by the phase detecting unit 305 by the time equivalent to one symbol, and outputs the result as the delayed phase.

The phase adding unit 313 detects the phase difference between the detected phase and the delayed phase and outputs this as the phase data θ1.

The phase demodulating units 330~332 have the same construction as the phase demodulating unit 329 and so output the phase data θ2~θ4.

The I component ROMs 317~320 and the Q component ROMs 321~324 respectively correspond to the phase demodulating units 329~332. Using the combining coefficients Rk (k=1, 2, 3, 4) and the phase data θk (k=1, 2, 3, 4), these ROMs output the in-phase components $Rk^2 * \cos \theta k$ (k=1, 2, 3, 4) of the reception signals and the quadrature components $Rk^2 * \sin \theta k$ (k=1, 2, 3, 4) of the reception signals that have both been weighted using the combining coefficients Rk.

These combining coefficients Rk are signals showing the signal levels (RSSI: Received Signal Strength Indicator) that have been detected by a high-frequency receiving unit (not illustrated) in each phase demodulating unit 329~332.

The I component ROMs 317~320 store beforehand the input reception signals $Rk^2*\cos \theta k$ (k=1, 2, 3, 4) for the in-phase components for every possible combination of the combining coefficients Rk (k=1, 2, 3, 4) and phase data $\theta k$ (k=1, 2, 3, 4).

Both the combining coefficients Rk and phase data $\theta k$ are 8 bits long. The I component ROMs 317~320 store calculation results for all combinations of the $2^8$ different values of Rk and the $2^8$ different values of $\theta k$, which is to say $2^{16}$ different calculation results. When the combining coefficients Rk and different values of the phase data $\theta k$ are inputted, the I component ROMs 317~320 output the values of $Rk^2*\cos \theta k$ corresponding to the inputted combination.

In the same way, the Q component ROMs 321~324 store beforehand the input reception signals $Rk^2*\sin \theta k$ (k=1, 2, 3, 4) for the quadrature components for every possible combination of the combining coefficients Rk (k=1, 2, 3, 4) and phase data $\theta k$ (k=1, 2, 3, 4). When the combining coefficients Rk and different values of the phase data $\theta k$ are inputted, the Q component ROMs 321~324 output the values of $Rk^2*\sin \theta k$ corresponding to the inputted combination.

The I component adder 325 combines the weighted in-phase components $Rk^2*\cos \theta k$ (k=1, 2, 3, 4) of the reception signals that have been outputted by the I component ROMs 317~320 and outputs the combined in-phase components of the reception signals.

The Q component adder 326 combines the weighted quadrature components $Rk^2*\sin \theta k$ (k=1, 2, 3, 4) of the reception signals that have been outputted by the Q component ROMs 321~324 and outputs the combined quadrature components of the reception signals.

The clock generating unit 328 extracts symbol sections from the combined in-phase components and quadrature components of the reception signals outputted by the I component adder 325 and the Q component adder 326. Based on the extracted symbol sections, the clock generating unit 328 generates a clock that serves as the standard for the judgement timing of the judging unit 327.

The judging unit 327 outputs two-bit (four value) data by judging whether the combined in-phase components and quadrature components of the reception signals outputted by the I component adder 325 and the Q component adder 326 are positive or negative. The judging unit 327 performs these judgements in synchronization with the clock generated by the clock generating unit 328.

In this way, a diversity receiving apparatus that uses the conventional maximal-ratio combining method decodes data from a reception signal.

There are cases with conventional diversity receiving apparatuses, however, where the extraction timing of symbol sections significantly deviates within the clock generating unit 328. In such case, the clock generating unit 328 generates a clock with deviated timing. Since the judging unit 327 operates in synchronization with this clock, the judging unit 327 will perform its judgements with a non-optimal judgement timing. This can result in the judging unit 327 making erroneous judgements.

DISCLOSURE OF INVENTION

In view of the stated problems, it is a first object of the present invention to provide a diversity receiving apparatus and a clock generating circuit for a diversity receiving apparatus that prevent deviation in the symbol section extraction by a clock generating unit and so prevent a judging unit from making judgement errors.

The first object of the present invention can be achieved by a diversity receiving apparatus that separatelly-weights reception signals of a plurality of reception systems using combining coefficients based on a respective amplitude component of each reception signal, combines the weighted reception signals, extracts symbol sections in the combined reception signals, and generates a clock for detecting symbols, the diversity receiving apparatus including: a judging unit for judging whether every combining coefficient is below a predetermined threshold; a multiplying unit for uniformly multiplying every combining coefficient when the judging unit judges that every combining coefficient is below the predetermined threshold; and a combining unit for combining the reception signals using the multiplied combining coefficients.

With the stated construction, the combining coefficients are uniformly multiplied if every combining coefficient is below the predetermined threshold. This increases the dynamic range of the combined reception signals. As a result, when the present diversity receiving apparatus extracts the symbol sections based on the combined reception signals, the zero-cross points that mark the extraction timing can be extracted with high precision. This prevents deviation in the symbol extraction, and so prevents a clock from being generated with deviated timing. This has the effect of reducing the number of judgement errors that occur when judging symbols in synchronization with the generated clock.

Here, the combining coefficients may be one of an received signal strength for each reception system and a parameter showing a reliability of the reception signal obtained by each reception system.

With the stated construction, the diversity receiving apparatus of the present invention can use either a received signal strength or a parameter showing the reliability of a reception signal as a combining coefficient for the reception signal.

Here, the multiplying unit may multiply every combining coefficient by a constant when the judging unit judges that every combining coefficient is below the predetermined threshold.

With the stated construction, the diversity receiving apparatus of the present invention does not need to use a standard multiplier, and instead can multiply the combining coefficients using a multiplier that can only multiply values by a constant. This reduces the hardware scale of the diversity receiving apparatus.

Here, the constant may be related to a result of dividing a maximum value for the combining coefficients by the threshold.

As a result, the diversity receiving apparatus of the present invention can ensure that the combining coefficients that have been uniformly multiplied by the constant will not exceed the full range for the combining coefficients.

Here, each combining coefficient may be expressed using a predetermined number of bits, the constant being $2^n$ and the predetermined threshold being found by dividing a maximum value that can be expressed using the predetermined number of bits by $2^n$, where $1 \leq n <$ the predetermined number of bits.

With the stated construction, the multiplying unit can be realized by a shifter, thereby simplifying the construction of the diversity receiving apparatus of the present invention.

The stated object can also be achieved by a diversity receiving apparatus that separately weights reception signals of a plurality of reception systems using combining coefficients based on a respective amplitude component of each reception signal, combines the weighted reception signals, extracts symbol sections in the combined reception signals, and generates a clock for detecting symbols, the diversity receiving apparatus including: a judging unit for judging whether every combining coefficient is below a predetermined threshold; a multiplying unit for uniformly multiplying every combining coefficient when the judging unit judges that every combining coefficient is below the predetermined threshold; a combining unit for combining the reception signals using the multiplied combining coefficients; and a generating unit for generating a clock that is synchronized with the reception signals of the reception systems using the reception signals combined by the combining unit.

With the stated construction, the combining coefficients are uniformly multiplied if every combining coefficient is below the predetermined threshold. This increases the dynamic range of the combined reception signals. As a result, when the present diversity receiving apparatus extracts the symbol sections based on the combined reception signals, the zero-cross points that mark the extraction timing can be extracted with high precision. This prevents deviation in the symbol extraction, and so prevents a clock from being generated with deviated timing. This has the effect of reducing the number of judgement errors that occur when judging symbols in synchronization with the generated clock.

The stated object can also be achieved by a diversity receiving apparatus that separately weights reception signals of a plurality of reception systems using combining coefficients based on a respective amplitude component of each reception signal, combines the weighted reception signals, and generates a clock for detecting symbols based on the combined reception signals, the diversity receiving apparatus including: a judging unit for judging whether every combining coefficient is below a predetermined threshold; a multiplying unit for doubling every combining coefficient when the judging unit judges that every combining coefficient is below the predetermined threshold; a control unit for repeatedly activating the judging unit and multiplying unit until the judging unit judges that at least one of the combining coefficients is no longer below the predetermined threshold; a combining unit for combining the reception signals using the multiplied combining coefficients when the judging unit judges that at least one of the combining coefficients is no longer below the predetermined threshold; and a generating unit for generating a clock that is synchronized with the reception signals of the plurality of reception systems using the reception signals combined by the combining unit.

With the stated construction, the diversity receiving apparatus of the present invention can achieve the effects described above.

The stated object can also be achieved by a clock generating circuit for use by a diversity receiving apparatus that separately weights reception signals of a plurality of reception systems using combining coefficients based on a respective amplitude component of each reception signal and combines the weighted reception signals, the clock generating circuit including: a judging unit for judging whether every combining coefficient is below a predetermined threshold; a multiplying unit for multiplying every combining coefficient when the judging unit judges that every combining coefficient is below the predetermined threshold; a combining unit for combining the reception signals using the multiplied combining coefficients; and a generating unit for generating a clock that is synchronized with the reception signals of the plurality of reception systems using the reception signals combined by the combining unit.

With the stated construction, the combining coefficients are uniformly multiplied if every combining coefficient is below the predetermined threshold. This increases the dynamic range of the combined reception signals. As a result, when symbol sections are extracted based on the combined reception signals, the zero-cross points that mark the extraction timing can be extracted with high precision, meaning that the present clock generating circuit can generate a clock without deviation.

BRIEF DESCRIPTION OF DRAWINGS

These and other objects, advantages and features of the invention will become apparent from the following description thereof taken in conjunction with the accompanying drawings which illustrate a specific embodiment of the invention. In the drawings.

BEST MODE FOR CARRYING OUT THE INVENTION

First Embodiment

Figure 1:
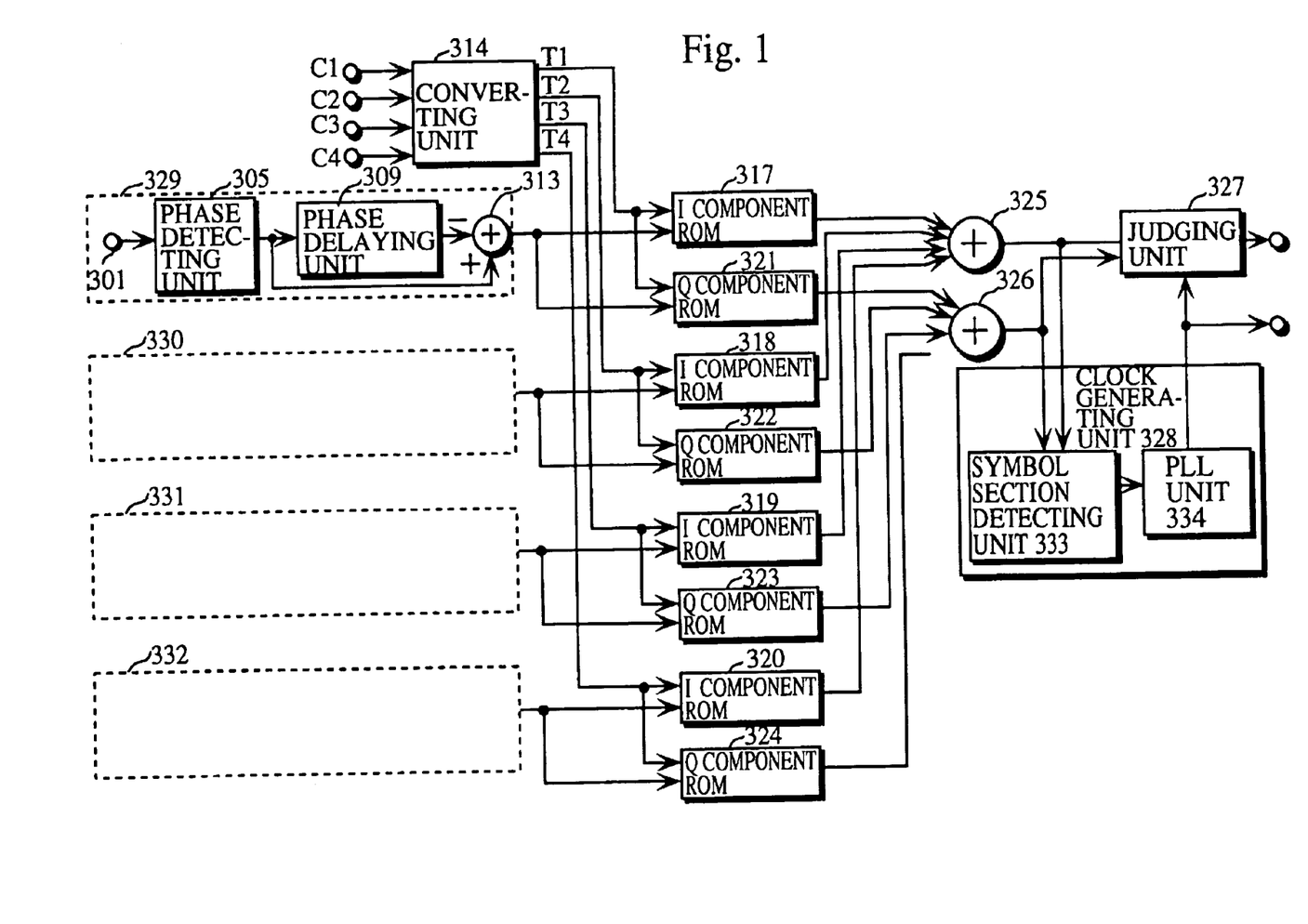
FIG. 1 shows a diversity receiving apparatus for the maximal-ratio combining method according to the first embodiment of the present invention.

FIG. 1 shows a diversity receiving apparatus for the maximal-ratio combining method according to the first embodiment of the present invention.

The present diversity receiving apparatus gives the in-phase components and quadrature components of the reception signal received by the four reception systems a weighting (through multiplication by a combining coefficient) based on the reception level (RSSI: Received Signal Strength Indicator) of each reception signal. The diversity receiving apparatus then combines the weighted reception signals. After this, the diversity receiving apparatus judges the sign ("plus" or "minus") of the combined in-phase components of the reception signals and the combined quadrature components of the reception signals to obtain two-bit (four value) decoded data that it outputs. When giving a weighting based on a reception level to the in-phase components and the quadrature components of the reception signals, the present diversity receiving apparatus uniformly amplifies each reception level before giving the weighting if every reception level is below a predetermined threshold.

When performing the sign judgement, the present diversity receiving apparatus extracts symbol sections based on the combined in-phase components and quadrature components of the reception signals and generates a clock that sets the judgement timing according to the extracted symbol sections.

To operate as described above, the present diversity receiving apparatus includes a converting unit 314, phase detection units 329~332, I component ROMs 317~320, Q component ROMs 321~324, an I component adder 325, a Q component adder 326, a judging unit 327, and a clock generating unit 328.

The converting unit 314 receives an input of the reception levels Ck (k=1, 2, 3, 4) corresponding to the phase detection units 329~332 and judges whether every reception level Ck (k=1, 2, 3, 4) is below a predetermined threshold (or in other words, whether there is at least one reception level that exceeds the predetermined threshold).

If the result of this judgement is that all reception levels Ck (k=1, 2, 3, 4) are below the predetermined threshold, the converting unit 314 uniformly multiplies the reception levels Ck to produce the combining coefficients Tk that the converting unit 314 then outputs.

Conversely, when the converting unit 314 judges that at least one reception level exceeds the predetermined level, the converting unit 314 outputs the reception levels Ck (k=1, 2, 3, 4) without amendment as the combining coefficients Tk (k=1, 2, 3, 4).

The reception levels inputted into the converting unit 314 are signals that have been detected by high-frequency receiving units (not illustrated) in the phase demodulating units 329~332, and as one example are eight-bit digital data. The uniform multiplication described here refers to the multiplication of the four reception levels by a predetermined multiplier so that the reception levels are increased with the ratio between their values being maintained.

The phase demodulating units 329~332 detect the phase difference between the phase of each received reception signal and the phase of the immediately preceding symbol section in the signal, and output the results as the phase data $\theta k$ (k=1, 2, 3, 4). Here, the values k=1, 2, 3, 4 respectively correspond to the phase demodulating units 329, 330, 331, and 332.

In detail, the phase demodulating unit 329 includes an input terminal 301, a phase detecting unit 305, a phase delaying unit 309, and a phase adding unit 313. This composes a phase-detection type delay detection device corresponding to the PSK (Phase Shift Keying) modulation method.

The input terminal 301 is a terminal through which a reception signal, which has been digitized by an A/D converter or a limiter, is inputted into the present diversity receiving apparatus.

The phase detecting unit 305 compares the phase of the reception signal inputted via the input terminal 301 with the phase of a local oscillator (not illustrated) and outputs the detected phase value that has been digitized. This means that the phase detecting unit 305 detects only the phase component of the reception signal. Since the amplitude component of the reception signal is not required by the phase detecting unit 305, a linear amplifier is not required.

The phase delaying unit 309 delays the detected phase outputted by the phase detecting unit 305 by the time equivalent to one symbol, and outputs the result as the delayed phase.

The phase adding unit 313 detects the phase difference between the detected phase and the delayed phase and outputs this as the phase data $\theta 1$.

The phase demodulating units 330~332 have the same construction as the phase demodulating unit 329 and so output the phase data $\theta 2 \sim \theta 4$.

The I component ROMs 317~320 and the Q component ROMs 321~324 respectively correspond to the phase demodulating units 329~332. Using the combining coefficients Tk (k=1, 2, 3, 4) and the phase data $\theta k$ (k=1, 2, 3, 4), these ROMs output the in-phase components $Tk^2 * \cos \theta k$ (k=1, 2, 3, 4) of the reception signals and the quadrature components $Tk^2 * \sin \theta k$ (k=1, 2, 3, 4) of the reception signals that have both been weighted using the combining coefficients Tk.

The I component ROMs 317~320 store beforehand the in-phase components $Tk^2 * \cos \theta k$ (k=1, 2, 3, 4) of the reception signals for every possible combination of the combining coefficients Tk (k=1, 2, 3, 4) and phase data $\theta k$ (k=1, 2, 3, 4).

Both the combining coefficients Tk and phase data $\theta k$ are 8 bits long. The I component ROMs 317~320 store calculation results for all combinations of the $2^8$ different values of Tk and the $2^8$ different values of $\theta k$, which is to say $2^{16}$ different calculation results. When the combining coefficients Tk and different values of the phase data $\theta k$ are inputted, the I component ROMs 317~320 output the values of $Tk^2 * \cos \theta k$ corresponding to the inputted combination.

In the same way, the Q component ROMs 321~324 store beforehand the quadrature components $Tk^2 * \sin \theta k$ (k=1, 2, 3, 4) of the reception signals for every possible combination of the combining coefficients Tk (k=1, 2, 3, 4) and phase data $\theta k$ (k=1, 2, 3, 4). Both the combining coefficients Tk and phase data $\theta k$ are 8 bits long so that the Q component ROMs 321~324 store calculation results for all combinations of the $2^8$ different values of Tk and the $2^8$ different values of $\theta k$, which is to say $2^{16}$ different calculation results. When the combining coefficients Tk and the different values of the phase data $\theta k$ are inputted, the Q component ROMs 321~324 output the values of $Tk^2 * \sin \theta k$ corresponding to the inputted combination.

The I component adder 325 combines the weighted in-phase components $Tk^2 * \cos \theta k$ (k=1, 2, 3, 4) that have been outputted by the I component ROMs 317~320 and outputs the combined in-phase components of the reception signals.

The Q component adder 326 combines the weighted quadrature components $Tk^2 * \sin \theta k$ (k=1, 2, 3, 4) that have been outputted by the Q component ROMs 321~324 and outputs the combined quadrature components of the reception signals.

The clock generating unit 328 includes the symbol section detecting unit 333 and the PLL (Phase Locked Loop) unit 334. With this construction, the clock generating unit 328 generates a clock according to the combined in-phase components and quadrature components of the reception signals outputted by the I component adder 325 and the Q component adder 326. This clock is used as the standard for the judgement timing of the judging unit 327.

In more detail, the symbol section detecting unit 333 detects symbol sections based on the combined in-phase components and the quadrature components outputted by the I component adder 325 and the Q component adder 326. The symbol section detecting unit 333 detects the symbol sections by detecting the zero cross points of the combined in-phase components and quadrature components of the reception signals.

The PLL unit 330 generates a clock that is used as the standard for the judgement timing of the judging unit 327 according to the symbol sections detected by the symbol section detecting unit 333.

In this way, the clock generating unit 328 generates a clock according to a self-timing method that generates the clock in synchronization with the reception signals, based on the combined in-phase components and quadrature components of the reception signals.

The judging unit 327 outputs two-bit (four value) data by judging whether the combined in-phase components and quadrature components of the reception signals outputted by the I component adder 325 and the Q component adder 326 are positive or negative. The judging unit 327 performs these judgements in synchronization with the clock~generated by the clock generating unit 328.

In the judging unit 327, deviations (clock phase errors) that can cause judgement errors are present in the clock inputted by the clock generating unit 328. If there are deviations in the clock inputted into the judging unit 327, the judging unit 327 can end up performing the judgement with a timing that deviates somewhat from the ideal timing. This increases the probability of erroneous judgements being made.

To prevent erroneous judgements from being made, the clock generating unit 328 needs to generate the clock with high precision. To enable the clock generating unit 328 to do this, the symbol section detecting unit 333 needs to correctly detect the symbol sections in the combined reception signals. Here, the higher the dynamic range of the inputted combined in-phase components and quadrature components of the reception signals, the higher the accuracy with which the symbol section detecting unit 333 can detect the zero cross points in the combined reception signals when detecting the symbol sections.

Based on the above, the diversity receiving apparatus of the present invention uniformly multiplies the reception levels if every reception level is below a predetermined threshold. Since these multiplied reception levels are used as the combining coefficients, the combined in-phase components and the quadrature components of the reception signals produced by the combining will have a high dynamic range.

Figure 2:
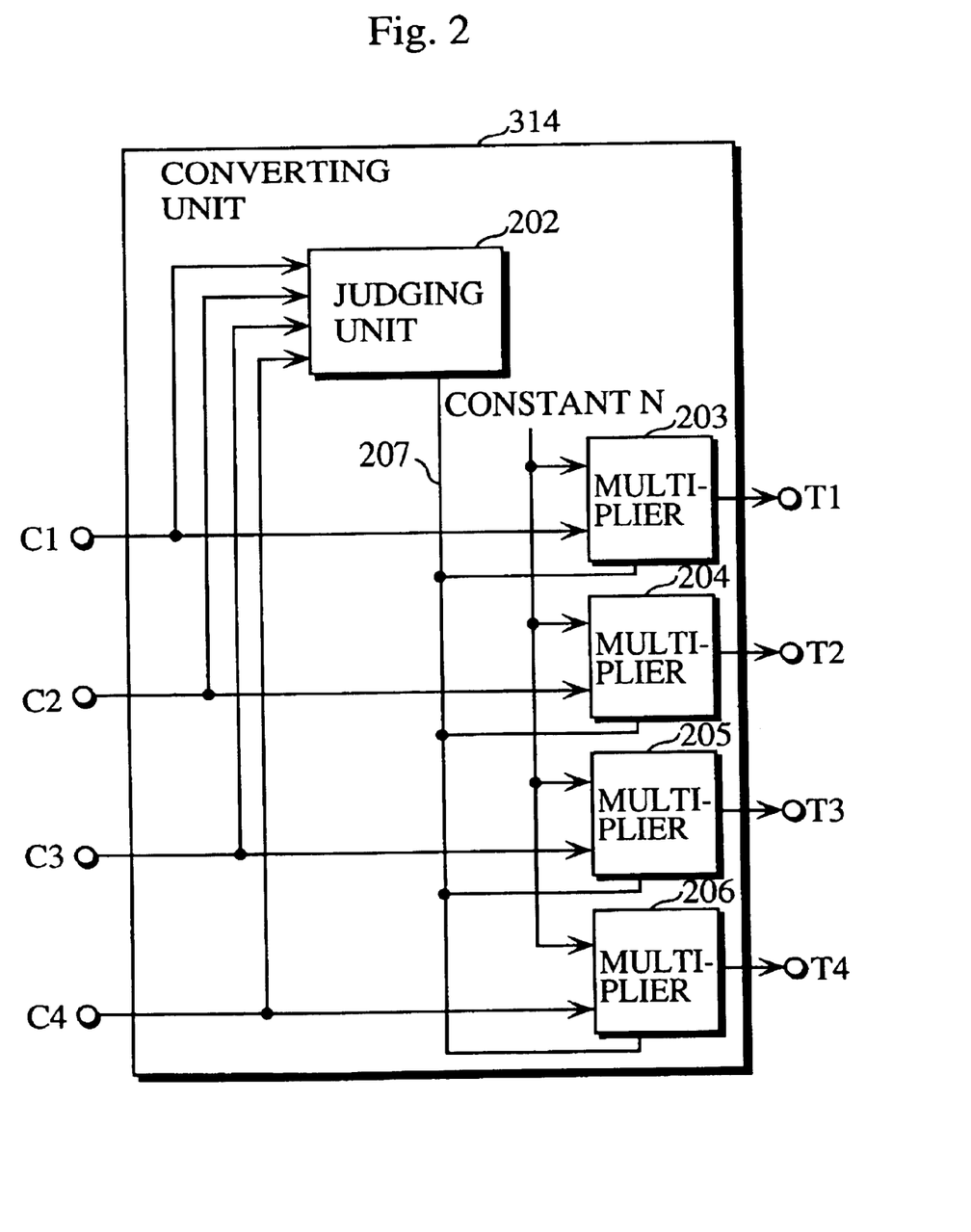
FIG. 2 is a block diagram showing the construction of the converting unit 314 in more detail.

FIG. 2 is a block diagram showing the construction of the converting unit 314 in more detail.

The converting unit 314 includes the judging unit 202 and the multipliers 203~206. As shown by the examples in FIGS. 3A and 3B, if every reception level Ck (k=1, 2, 3, 4) is below the threshold, the converting unit 314 multiplies each reception level uniformly by the constant N.

Here, it is preferable for the threshold to be a value in a range that is ⅛~¼ of the full range of the reception level Ck. The constant N is a value that is one or greater. This value may be set at a value that is equal to or smaller than the inverse of the threshold. In the present embodiment, the constant N is four. The reason the threshold and the constant N may be in an inverse relationship is that this ensures that a value that is N times the reception level Ck will not exceed the full range of the reception level Ck.

On receiving the four reception levels Ck, the judging unit 202 judges whether all of these reception levels Ck are below the threshold. If so, the judging unit 202 outputs the judgement signal 207 that gives notice of this.

When the judgement signal 207 has been inputted from the judging unit 202, the multipliers 203~206 multiply the reception levels Ck by the constant N and output the results as the combining coefficients Tk. This means that Tk=Ck*N (k=1, 2, 3, 4). When the judgement signal is not inputted from the judging unit 202, the multipliers 203~206 respectively output the reception level Ck as the combining coefficient Ck.

Figure 4:
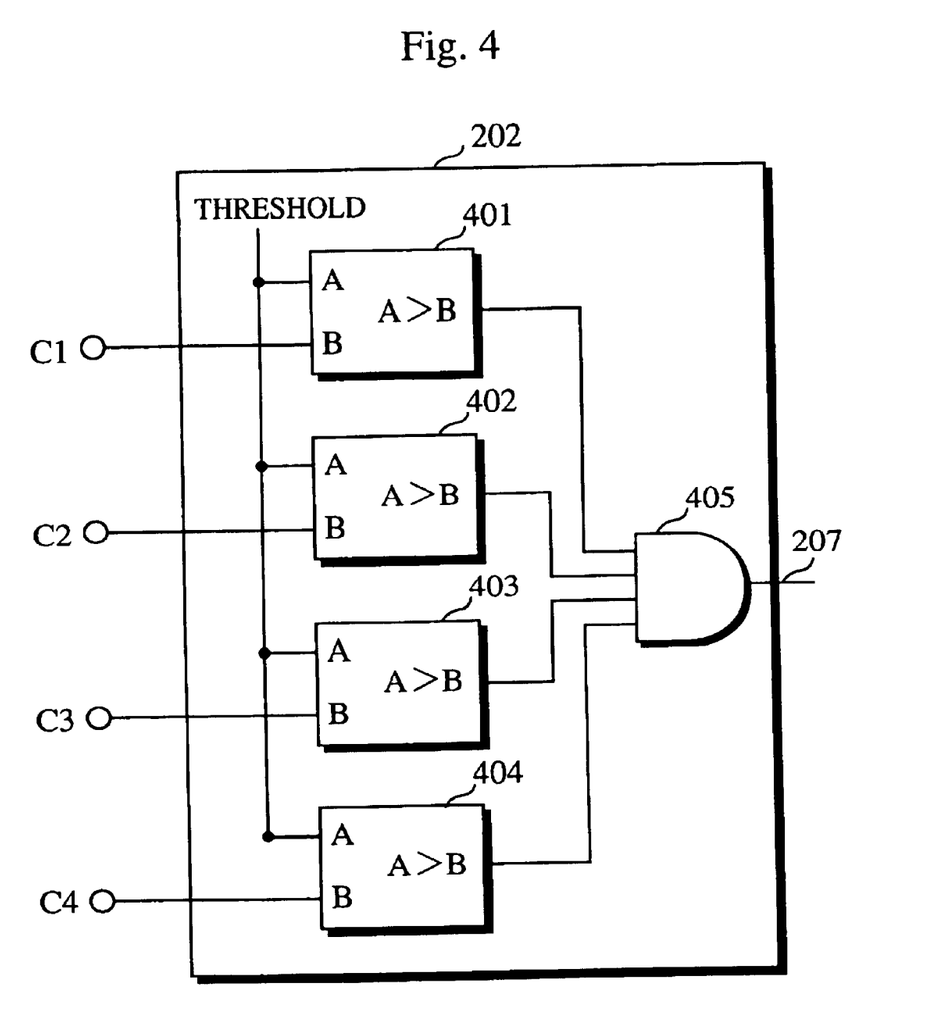
FIG. 4 is a block diagram showing the construction of the judging unit 202 in more detail.

FIG. 4 is a block diagram showing the construction of the judging unit 202 in more detail.

The judging unit 202 includes the comparators 401~404 and the AND circuit 405.

The comparators 401~404 respectively compare the magnitudes of the reception levels Ck (k=1, 2, 3, 4) with the threshold. When the threshold is greater than a respective reception level Ck, the comparators each output a signal Sk (k=1, 2, 3, 4) to the AND circuit 405.

The AND circuit 405 outputs the judgement signal 207 only when all four signals Sk (k=1, 2, 3, 4) have been inputted, which is to say, only if every reception level Ck is below the threshold.

Figure 5:
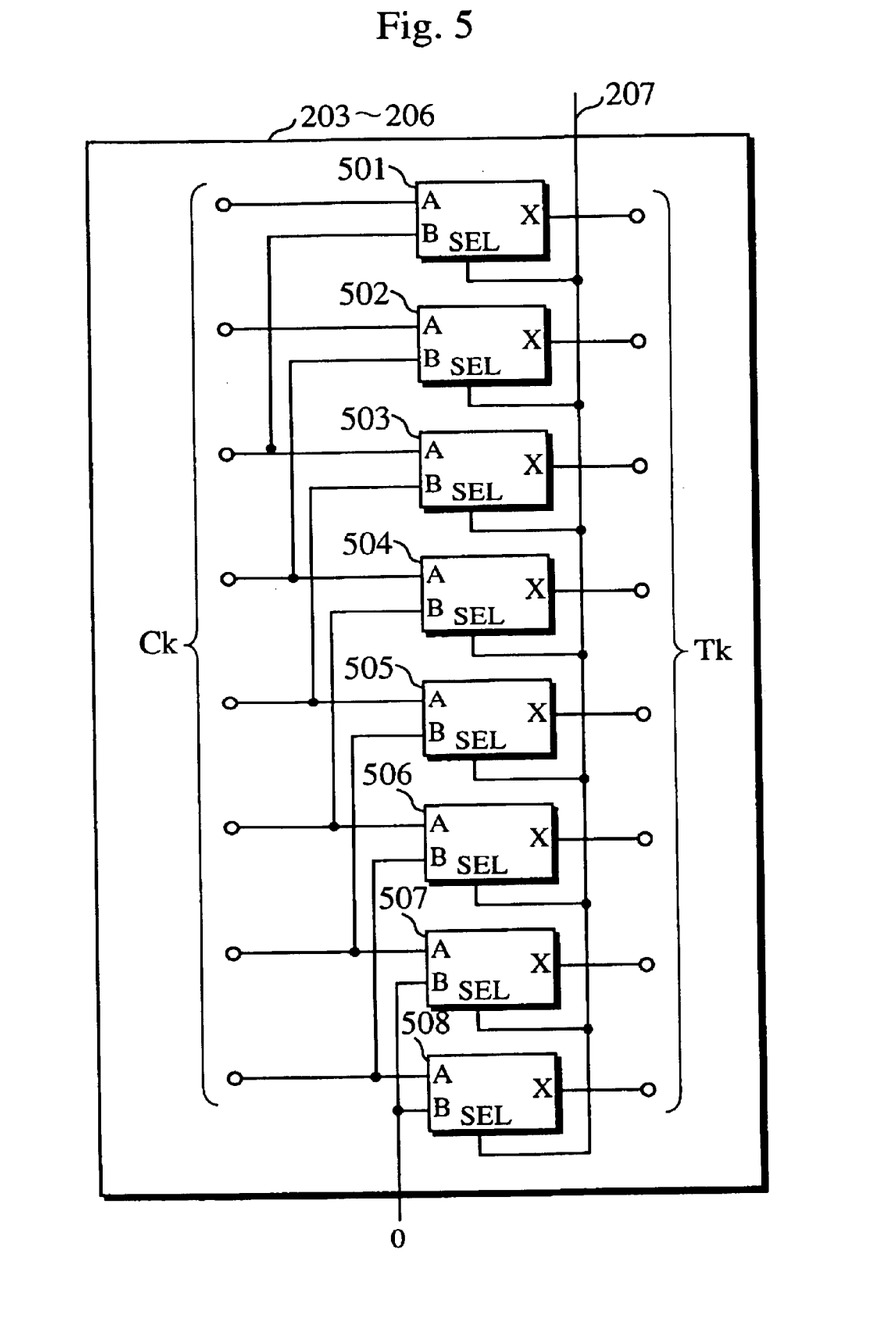
FIG. 5 is a block diagram showing an example construction of the multipliers 203~206 in detail.

FIG. 5 is a block diagram showing an example construction of the multipliers 203~206 in detail.

The multipliers 203~206 include the selectors 501~508 and are configured so as to produce a product of a constant and an inputted eight-bit reception level Ck.

The selectors 501~508 output the signals inputted from the eight input terminals A to the output terminals X when the judgement signal 207 is not inputted from the judging unit 202, and output the signals inputted from the eight input terminals B to the output terminals X when the judgement signal 207 is inputted.

An eight bit signal representing the reception level Ck is inputted into the input terminals A of the selectors 501~508 in parallel. The most significant bit (MSB) of the reception level Ck is inputted into the selector 501 and the least significant bit (LSB) is inputted into the selector 508. A bit value at two bit positions lower in the eight-bit reception signal Ck is inputted into the B input terminals of the selectors 501~506, while the value "0" is inputted into the B terminals of the selectors 507 and 508. As a result, the multipliers 203~206 output Tk=Ck when the judgement signal 207 is not inputted, and output Tk=Ck*4 when the judgement signal 207 is inputted.

The following is an explanation of the operation of a diversity receiving apparatus of the first embodiment of the present invention whose construction has been described above.

Figure 3A:
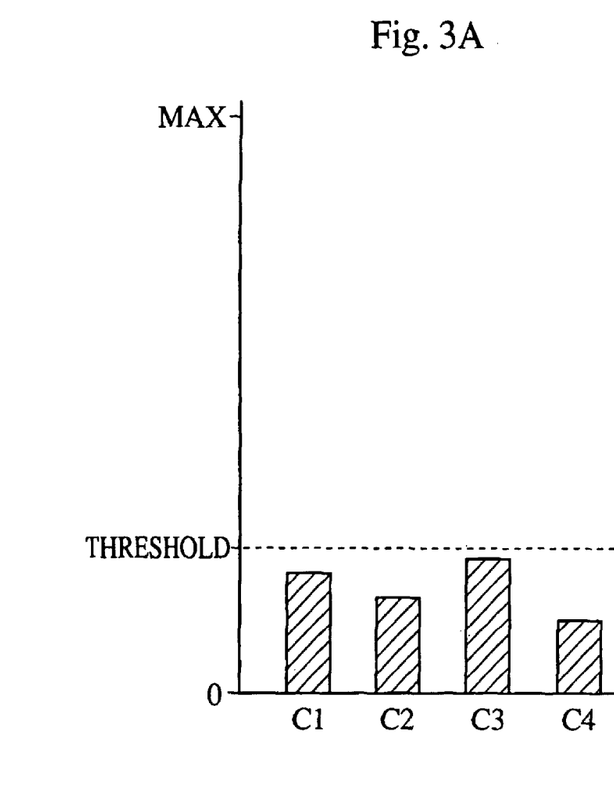
FIGS. 3A and 3B are graphs showing values of the reception level Ck (k=1, 2, 3, 4) that are inputted into the converting unit 314 before and after conversion.

FIG. 3A is a graph showing values of the reception level Ck (k=1, 2, 3, 4) that are inputted into the converting unit 314. In FIG. 3A, the vertical axis shows the full range ("MAX") for the combining coefficients with the threshold as ¼ of the full range. Each reception level Ck in FIG. 3A is below the threshold value.

When the reception levels Ck shown in FIG. 3A are inputted into the converting unit 314, the judging unit 202 compares the magnitudes of the reception levels Ck with the threshold. Since this comparison finds that every reception level Ck is below the threshold, the judging unit 202 outputs the judgement signal 207 to the multipliers 203~206.

When the judgement signal 207 has been inputted from the judging unit 202, the multipliers 203~206 shift the bit values in the reception level Ck upwards by two bits.

Figure 3B:
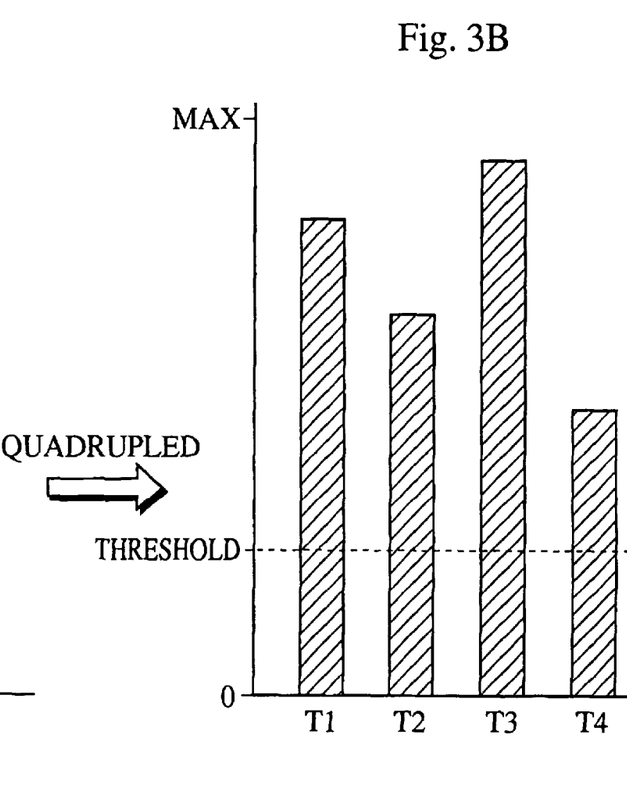

FIG. 3B is a graph showing the combining coefficients Tk that are outputted by the converting unit 314 when the reception levels Ck shown in FIG. 3A are inputted into the converting unit 314.

Meanwhile, when a reception signal is inputted, the phase demodulating units 329~332 detect the phase component having removed the amplitude component of the reception signals. The phase demodulating units 329~332 output phase data θk (k=1, 2, 3, 4) obtained as the phase difference between the detected phase component and the delayed phase.

The I component ROMs 317~320 and the Q component ROMs 321~324 receive an input of the combining coefficients Tk and the phase data θk and output $Tk^2*\cos θk$ and $Tk^2*\sin θk$.

The I component adder 325 and the Q component adder 326 respectively combine the different values of $Tk^2*\cos\theta k$ and $Tk^2*\sin\theta k$ and output the results as the combined in-phase components and the quadrature components of the reception signals to the clock generating unit 328 and the judging unit 327.

Here, the lower the value of Tk, the lower the dynamic range of the combined in-phase components and quadrature components of the reception signals. As mentioned earlier, a low dynamic range adversely affects the detection of the symbol sections by the clock generating unit 328. Accordingly, the present diversity receiving apparatus has the converting unit 314 multiply the combining coefficients Tk, so that a wide dynamic range is maintained for the combined in-phase components and quadrature components $Tk^2*\cos\theta k$ and $Tk^2*\sin\theta k$. This avoids the adverse effects described earlier.

The judging unit 327 judges whether the combined in-phase components and quadrature components of the reception signals are positive or negative based on the clock that is highly precisely generated by the clock generating unit 328. The judging unit 327 outputs the result of its judgement as the decoded data.

Second Embodiment

The overall construction of the diversity receiving apparatus in the second embodiment of the present invention is the same as that shown in FIG. 1, though the converting unit 314 has a different internal configuration. This difference is that the converting unit 314 is composed of a microprocessor or a DSP (Digital Signal Processor).

Figure 6:
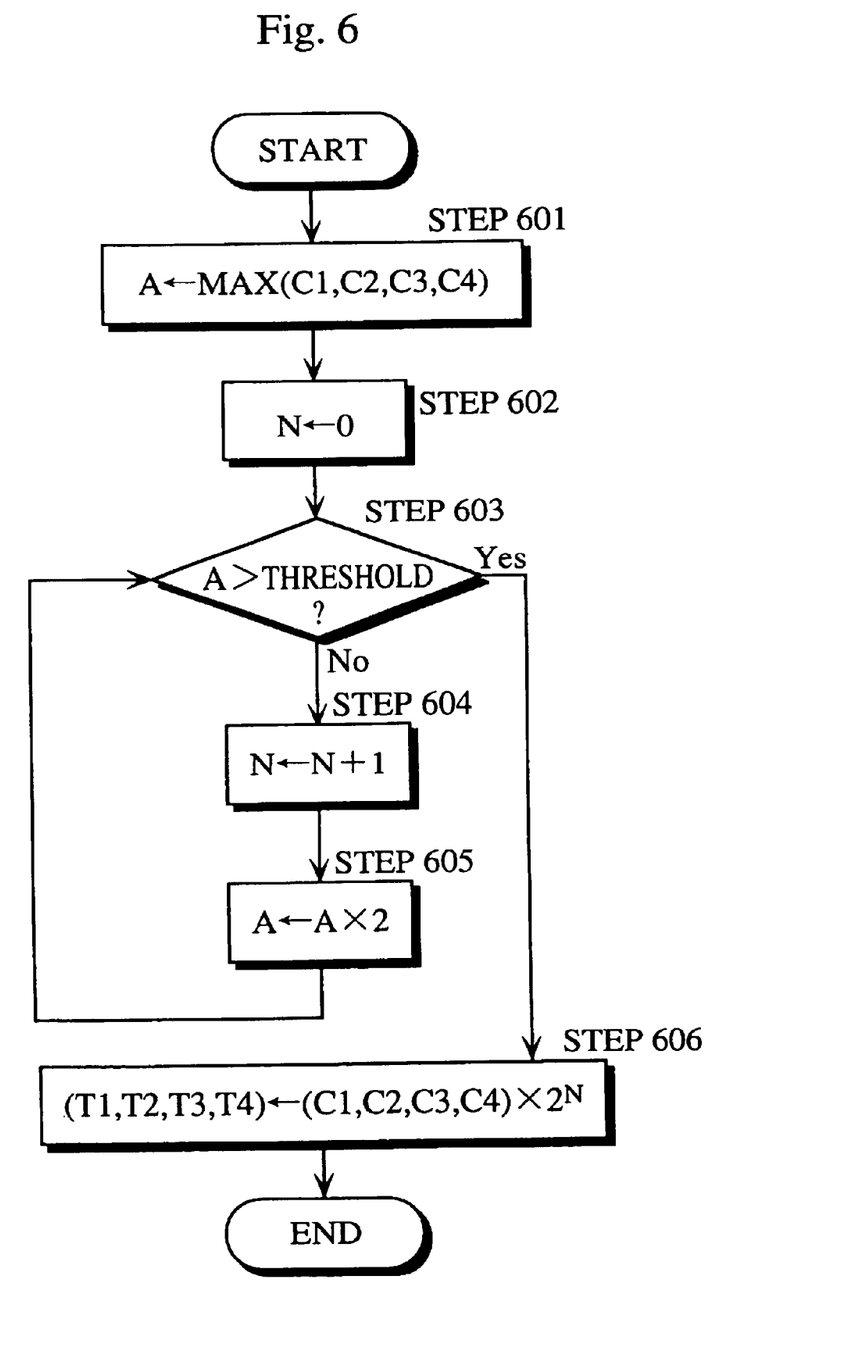
FIG. 6 is a flowchart showing the processing of the converting unit 314 in the second embodiment.

FIG. 6 is a flowchart showing the processing of the converting unit 314 in the second embodiment.

The converting unit 314 stores the largest signal value out of the four inputted reception levels Ck (k=1, 2, 3, 4) in the register A (Step 601). The converting unit 314 then substitutes the initial value 0 into the variable N (Step 602).

Next, the converting unit 314 compares the value in the register A with a threshold (here set at half the full range). When the value in the register A is larger than the threshold (Step 603:Yes), the converting unit 314 proceeds to Step 606 and then terminates its processing. When the value in register A is equal to or below the threshold (Step 603:No), the converting unit 314 increments the value of the variable N by one (Step 604), stores a value that is double the value of register A into register A, and then returns to Step 603.

In this way, the processing in Steps 603~605 is repeated until the value in the register A exceeds the threshold. When the value in the register A exceeds the threshold (Step 603:Yes), the converting unit 314 finds the value $Ck*2^N$ for each reception level and sets the resulting values as the combining coefficients Tk (k=1, 2, 3, 4).

In the first and second embodiments, the reception level Ck is described as being a reception level signal (RSSI), although a parameter (alienation value) that shows the reliability of the received information may be used in place of the reception level signal.

Figure 7:
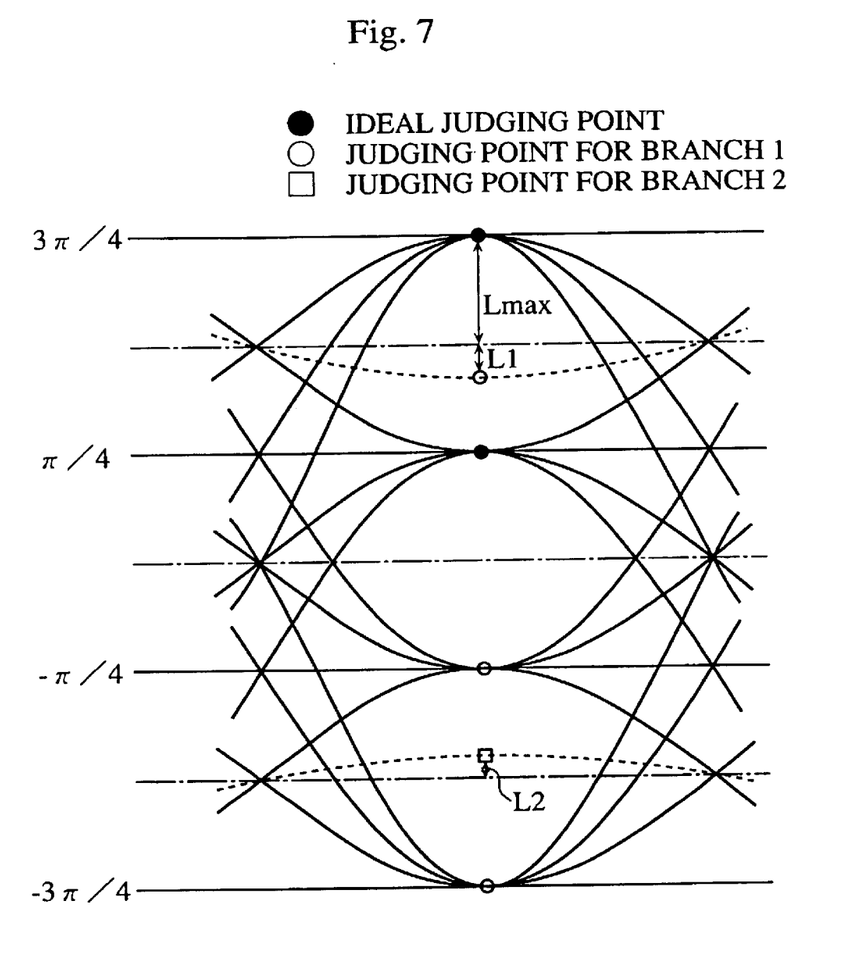
FIG. 7 shows the eye pattern of the phase data in QPSK (where the multiple sets of phase data have been plotted in synchronization for each modulation phase)

FIG. 7 shows the eye pattern of the phase data in QPSK (where the multiple sets of phase data have been plotted in synchronization for each modulation phase). The alienation values L1 and L2 are likelihood values for the ideal judging points for judging the phase data. The larger the alienation values, the closer the judging point to the ideal, which is to say the lower the proportion of noise in the reception signal.

In this way, the converting unit 314 of the diversity receiving apparatus of the present invention uniformly multiplies the value of each reception level on judging that the value of each reception level Ck is below a threshold and outputs the resulting values as the combining coefficients Tk. As a result, a high dynamic range can be maintained for the combined in-phase components and quadrature components of the reception signals that are outputted to the clock generating unit 328 via the I component ROMs 317~320, the Q component ROMs 321~324, the I component adder 325, and the Q component adder 326.

The symbol section detecting unit 333 can detect the symbol sections with high precision based on the combined in-phase components and quadrature components of the reception signals whose dynamic range has been expanded. The PLL unit 334 generates a highly precise clock, which is to say a clock that is precisely synchronized with the original reception signals, based on the detected symbol sections. This means that the judging unit 327 can perform its judgement with a judgement timing that is closer to the ideal judgement timing. This reduces the probability of judgement errors being made.

INDUSTRIAL APPLICABILITY

The diversity receiving apparatus of the present invention can prevent deviations in the generation of a clock by the clock generating unit when the reception levels are low and prevent the judging unit from making judgement errors. This is of particular use to mobile communication devices where deterioration in the reception level is often caused by fading and other factors.

What is claimed is:

1. A diversity receiving apparatus that separately weights reception signals of a plurality of reception systems using combining coefficients based on a respective amplitude component of each reception signal, combines the weighted reception signals, extracts symbol sections in the combined reception signals, and generates a clock for detecting symbols, the diversity receiving apparatus comprising:

judging means for judging whether every combining coefficient is below a predetermined threshold;

multiplying means for uniformly multiplying every combining coefficient by a number when the judging means judges that every combining coefficient is below the predetermined threshold; and combining means for combining the reception signals using the multiplied combining coefficients.

2. The diversity receiving apparatus of claim 1, wherein the combining coefficients are one of an received signal strength for each reception system and a parameter showing a reliability of the reception signal obtained by each reception system.

3. The diversity receiving apparatus of claim 2, wherein the multiplying means multiplies every combining coefficient by a constant when the judging means judges that every combining coefficient is below the predetermined threshold.

4. The diversity receiving apparatus of claim 3, wherein the constant is related to a result of dividing a maximum value for the combining coefficients by the predetermined threshold.

5. The diversity receiving apparatus of claim 4, wherein each combining coefficient is expressed using a predetermined number of bits, the constant being $2^n$ and the predetermined threshold being found by dividing the maximum value that can be expressed using the predetermined number of bits by $2^n$, where $1 \leq n <$ the predetermined number of bits and n is an integer.

6. A diversity receiving apparatus that separately weights reception signals of a plurality of reception systems using combining coefficients based on a receptive amplitude component of each reception signal, combines the weighted reception signals, extracts symbol sections in the combined reception signals, and generates a clock for detecting symbols, the diversity receiving apparatus comprising:

judging means for judging whether every combining coefficient is below a predetermined threshold;

multiplying means for uniformly multiplying every combining coefficient by a number when the judging means judges that every combining coefficient is below the predetermined threshold;

combining means for combining the reception signals using the multiplied combining coefficients; and generating means for generating the clock that is synchronized with the reception signals of the reception system using the reception signals combined by the combining means.

7. The diversity receiving apparatus of claim 6, wherein the combining coefficients are one of an received signal strength for each reception system and a parameter showing a reliability of the reception signal obtained by each reception system.

8. The diversity receiving apparatus of claim 7, wherein the multiplying means multiplies every combining coefficient by a constant when the judging means judges that every combining coefficient is below the predetermined threshold.

9. The diversity receiving apparatus of claim 8, wherein the constant is related to a result of dividing a maximum value for the combining coefficients by the predetermined threshold.

10. The diversity receiving apparatus of claim 9, wherein each combining coefficient is expressed using a predetermined number of bits, the constant being $2^n$ and the predetermined threshold being found by dividing the maximum value that can be expressed using the predetermined number of bits by $2^n$, wherein $1 \leq n <$ the predetermined number of bits and n is an integer.

11. A diversity receiving apparatus that separately weights reception signals of a plurality of reception systems using combining coefficients based on a respective amplitude component of each reception signal, combines the weighted reception signals, and generates a clock for detecting symbols based on the combined reception signals, the diversity receiving apparatus comprising:

judging means for judging whether every combining coefficient is below a predetermined threshold;

multiplying means for doubling every combining coefficient when the judging means judges that every combining coefficient is below the predetermined threshold;

control means for repeating activating the judging means and multiplying means until the judging means judges that at least one of the combining coefficients is no longer below the predetermined threshold;

combining means for combining the reception signals using the multiplied combining coefficients when the judging means judges at least one of the combining coefficients is no longer below the predetermined threshold; and generating means for generating the clock that is synchronized with the reception signals of the plurality of reception systems using the reception signals combined by the combining means.

12. The diversity receiving apparatus of claim 11, wherein the combining coefficients are one of an received signal strength for each reception system and a parameter showing a reliability of the reception signal obtained by each reception system.

13. A clock generating circuit for use by a diversity receiving apparatus that separately weights reception signals of a plurality of reception systems using combining coefficients based on a respective amplitude component of each reception signal and combines the weight reception signals, the clock generating circuit comprising:

judging means for judging whether every combining coefficient is below a predetermined threshold;

multiplying means for multiplying every combining coefficient by a number when the judging means judges that every combining coefficient is below the predetermined threshold;

combining means for combining the reception signals using the multiplied combining coefficients; and generating means for generating a clock that is synchronized with the reception signals of the plurality of reception systems using the reception of signals combined by the combining means.

* * * * *